(12) United States Patent
Xie et al.

(10) Patent No.: US 12,022,349 B2
(45) Date of Patent: Jun. 25, 2024

(54) LOAD BALANCING METHOD AND DEVICE

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Guangyi Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 556 days.

(21) Appl. No.: 17/287,656

(22) PCT Filed: Sep. 19, 2019

(86) PCT No.: PCT/CN2019/106652
§ 371 (c)(1),
(2) Date: Apr. 22, 2021

(87) PCT Pub. No.: WO2020/082945
PCT Pub. Date: Apr. 30, 2020

(65) Prior Publication Data
US 2021/0385718 A1    Dec. 9, 2021

(30) Foreign Application Priority Data

Oct. 22, 2018    (CN) .......................... 201811228627.7

(51) Int. Cl.
*H04W 36/22*    (2009.01)
*H04W 28/082*    (2023.01)
(Continued)

(52) U.S. Cl.
CPC ......... *H04W 36/22* (2013.01); *H04W 28/082* (2023.05); *H04W 36/08* (2013.01); *H04W 36/30* (2013.01)

(58) Field of Classification Search
CPC ... H04W 36/22; H04W 28/082; H04W 36/08; H04W 36/30
See application file for complete search history.

(56) References Cited

U.S. PATENT DOCUMENTS

| 5,276,907 A | 1/1994 | Meidan |
| 6,400,335 B1 | 6/2002 | Weaver |

(Continued)

FOREIGN PATENT DOCUMENTS

| CN | 101577927 A | 11/2009 |
| CN | 101765153 A | 6/2010 |

(Continued)

OTHER PUBLICATIONS

International Search Report in the international application No. PCT/CN2019/106652, mailed on Dec. 18, 2019, 2 pgs.

(Continued)

*Primary Examiner* — Duc C Ho
(74) *Attorney, Agent, or Firm* — Cooper Legal Group, LLC

(57) ABSTRACT

Provided are a load balancing method and device. The load balancing method comprises: a first base station to which a first cell belongs receiving beam load information, which is sent by a second base station to which a second cell belongs, of the second cell.

19 Claims, 7 Drawing Sheets

(51) Int. Cl.
   *H04W 36/08*   (2009.01)
   *H04W 36/30*   (2009.01)

(56) References Cited

U.S. PATENT DOCUMENTS

| | | |
|---|---|---|
| 2006/0135173 A1 | 6/2006 | Vannithamby |
| 2011/0053598 A1 | 3/2011 | Ahluwalia |
| 2012/0282930 A1 | 11/2012 | Ahluwalia |
| 2013/0165135 A1 | 6/2013 | Ahluwalia |
| 2015/0085826 A1 | 3/2015 | Ahluwalia |
| 2017/0250747 A1 | 8/2017 | Reinhardt et al. |
| 2018/0049093 A1 | 2/2018 | Ahluwalia |
| 2018/0077241 A1 | 3/2018 | Byun et al. |
| 2018/0199252 A1* | 7/2018 | Pawar .................. H04W 36/08 |
| 2018/0227899 A1 | 8/2018 | Yu et al. |
| 2020/0120518 A1* | 4/2020 | Geng .................. H04B 7/0695 |

FOREIGN PATENT DOCUMENTS

| | | |
|---|---|---|
| CN | 101828359 A | 9/2010 |
| CN | 101873610 A | 10/2010 |
| CN | 102333354 A | 1/2012 |
| CN | 103916908 A | 7/2014 |
| CN | 107770816 A | 3/2018 |
| CN | 107820717 A | 3/2018 |
| CN | 110831068 A | 2/2020 |
| EP | 0566674 A1 | 10/1993 |
| EP | 1184938 A1 | 3/2002 |
| EP | 3202198 A1 | 8/2017 |
| JP | 2014204171 A | 10/2014 |
| WO | 2016153325 A1 | 9/2016 |
| WO | 2018097680 A1 | 5/2018 |
| WO | 2018129300 A1 | 7/2018 |

OTHER PUBLICATIONS

English translation of the Written Opinion of the International Search Authority in the international application No. PCT/CN2019/106652, mailed on Dec. 18, 2019, 3 pgs.

Supplementary European Search Report in European application No. 19875166.1, mailed on Nov. 24, 2021, 10 pgs.

First Office Action of the Japanese application No. 2021-546418, issued on Jun. 21, 2022, 15 pgs.

First Office Action of the European application No. 19875166.1, issued on Aug. 1, 2022, 9 pgs.

* cited by examiner

LOAD BALANCING METHOD AND DEVICE

CROSS-REFERENCE TO RELATED APPLICATION

This application claims priority to Chinese Patent Application No. 201811228627.7 filed in China on Oct. 22, 2018, which is incorporated herein by reference in its entirety.

TECHNICAL FIELD

Embodiments of the present disclosure relate to the field of communications, and more particularly, to a method and a device for load balancing.

BACKGROUND

In a Long Time Evolution (LTE) network, when the users get together in a serving cell, the load of the cell is too high, and the capacity and Quality of Service (QoS) of the cell are affected. In order to ensure user experiences and limited utilization of radio resources, the load of the high-load cell is to be shared to the neighboring low-load cell in time.

To achieve efficient and high-quality load balancing, a limited load information interaction process between cells is indispensable. The main flow is as follows.

1. When the evaluation from the source cell shows that the load of the current cell is too high, the source cell triggers load balancing and initiates, to the neighboring cell, a resource status request for interacting resource status.

2. The neighboring cell feeds back a resource status response on the resource status in station or via an x2 interface, and transmits its own load information to the source cell.

3. The neighboring cell periodically transmits a resource status update message to the source cell.

The load information may carry all of or some of the following: Physical Resource Block Periodic (PRB Periodic), TNL load Ind Periodic, Hardware Load Ind Periodic (HW Load Ind Periodic), Composite Available Capacity Periodic (CAC Periodic), Almost Blank Subframe Status Periodic (ABS Status Periodic), Reference Signal Received Power Measurement Report Periodic (RSRP Measurement Report Periodic), and Channel Status Information Report Periodic (CSI Report Periodic).

4. The source cell selects an appropriate neighboring cell as the target cell through the collected information.

5. An appropriate terminal is selected, for example, a user is selected based on information such as a QoS class identifier (QCI) service type, a size of a PRB occupied by the user, and a location of the user; and the user is handed over and migrated to the corresponding target cell.

Since a multi-beam operation is introduced in the fifth-generation (5G) communication technology, not only the load of a cell but also the load of a beam is to be measured in a practical application scenario. When the overall cell load is not very high, the cell-based load balancing is generally not triggered in the related art, but the load of some of the beams may have reached a high level. Therefore, there is an urgent need for the beam-based load balancing.

SUMMARY

Some embodiments of the present disclosure provide a method and a device for load balancing, which may achieve beam-based load balancing.

Some embodiments of the present disclosure provide a method for load balancing, including: receiving, by a first base station to which a first cell belongs, beam load information of a second cell transmitted by a second base station to which the second cell belongs.

Some embodiments of the present disclosure also provide a method for load balancing, including: transmitting, by a second base station to which a second cell belongs, beam load information of the second cell to a first base station to which a first cell belongs.

Some embodiments of the present disclosure further provide a first base station, a first cell belonging to the first base station, the first base station comprising a first transceiver and a first processor, wherein the first transceiver is configured to receive beam load information of a second cell transmitted by a second base station to which a second cell belongs.

Some embodiments of the present disclosure further provide a second base station, a second cell belonging to the second base station, the second base station comprising a second transceiver and a second processor, wherein the second transceiver is configured to transmit beam load information of the second cell to a first base station to which a first cell belongs.

Some embodiments of the present disclosure also provide a network device, comprising a memory, a processor and a program stored on the memory and executable on the processor, the program, when executed by the processor, implementing the steps of the methods as described above.

Some embodiments of the present disclosure also provide a computer readable storage medium having stored thereon a computer program which, when executed by a processor, implements the steps of the methods as described above.

In some embodiments of the present disclosure, when the beam load in a cell is large, a base station selects a terminal to be handed over from the cell, and hands over the terminal to be handed over to other cells, thereby reducing the beam load in the cell.

BRIEF DESCRIPTION OF THE DRAWINGS

To describe the technical solution of the embodiments of the present disclosure more clearly, the accompanying drawings required for describing the embodiments of the present disclosure are briefly described. It is apparent that the accompanying drawings in the following description illustrate merely some of the embodiments of the present disclosure, and other drawings may be obtained by those of ordinary skill in the art without involving any inventive effort.

DETAILED DESCRIPTION

The technical solution in the embodiments of the present disclosure is described clearly and completely below in connection with the accompanying drawings in the embodiments of the present disclosure, and it is apparent that the described embodiments are a part, but not all, of the embodiments of the present disclosure. Based on the embodiments in the present disclosure, all other embodiments obtained by those of ordinary skill in the art without involving any inventive effort are within the scope of protection of the present disclosure.

The techniques described herein are not limited to LTE-Advanced (LTE-A) systems of Long Time Evolution (LTE), and may be further used in various wireless communication systems, such as fifth-generation New Radio (5G NR) systems and their evolution systems, Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and other systems.

It is to be understood that the embodiments of the present disclosure are described taking the 5G NR system as an example, and are also applicable to other systems, which are not be repeated herein. The 5G wireless network is also referred to as the fifth generation mobile phone mobile communication standard, which is an extension of the 4G. High carrier frequencies and an unprecedented number of antennas are used in the 5G wireless networks, thereby greatly increasing the transmission speed of signaling. In addition, any of the potential new 5G air interfaces, LTE, and WiFi may be incorporated into the 5G, thereby providing universal high coverage and a seamless user experience.

The terms "system" and "network" are often used interchangeably. A CDMA system may implement radio technologies such as CDMA2000, Universal Terrestrial Radio Access (UTRA), and the like. UTRA includes Wideband Code Division Multiple Access (WCDMA) and other CDMA variants. The TDMA system may implement a radio technology such as the Global System for Mobile Communication (GSM). OFDMA systems may implement radio technologies such as Ultra Mobile Broadband (UMB), Evolution-UTRA (E-UTRA), IEEE 802.11 (Wi-Fi), IEEE 802.16 (WiMAX), IEEE 802.20 and Flash-OFDM. UTRA and E-UTRA are part of the Universal Mobile Telecommunications System (UMTS). LTE and advanced LTE (e.g., LTE-A) are new UMTS versions adopting E-UTRA. UTRA, E-UTRA, UMTS, LTE, LTE-A, and GSM are described in the documents from an organization named 3rd Generation Partnership Project (3GPP); CDMA2000 and UMB are described in the documents from an organization named 3rd Generation Partnership Project 2 (3GPP2). The techniques described herein may be used for both the systems and radio technologies described above, as well as for other systems and radio technologies.

Figure 1A:
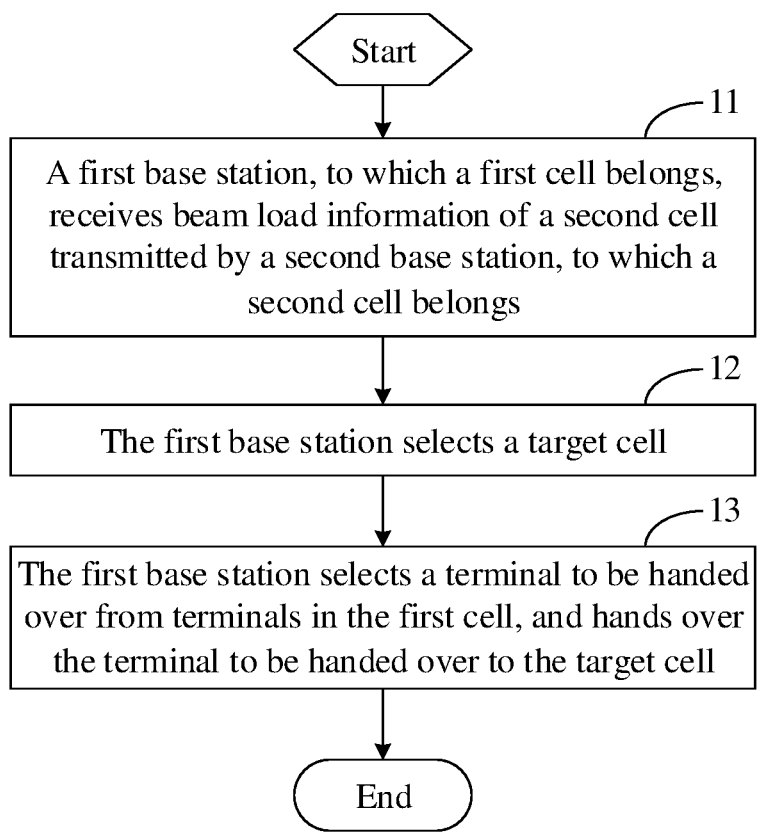
FIG. 1a is a first flow chart of a method for load balancing according to some embodiments of the present disclosure.
Figure 1B:
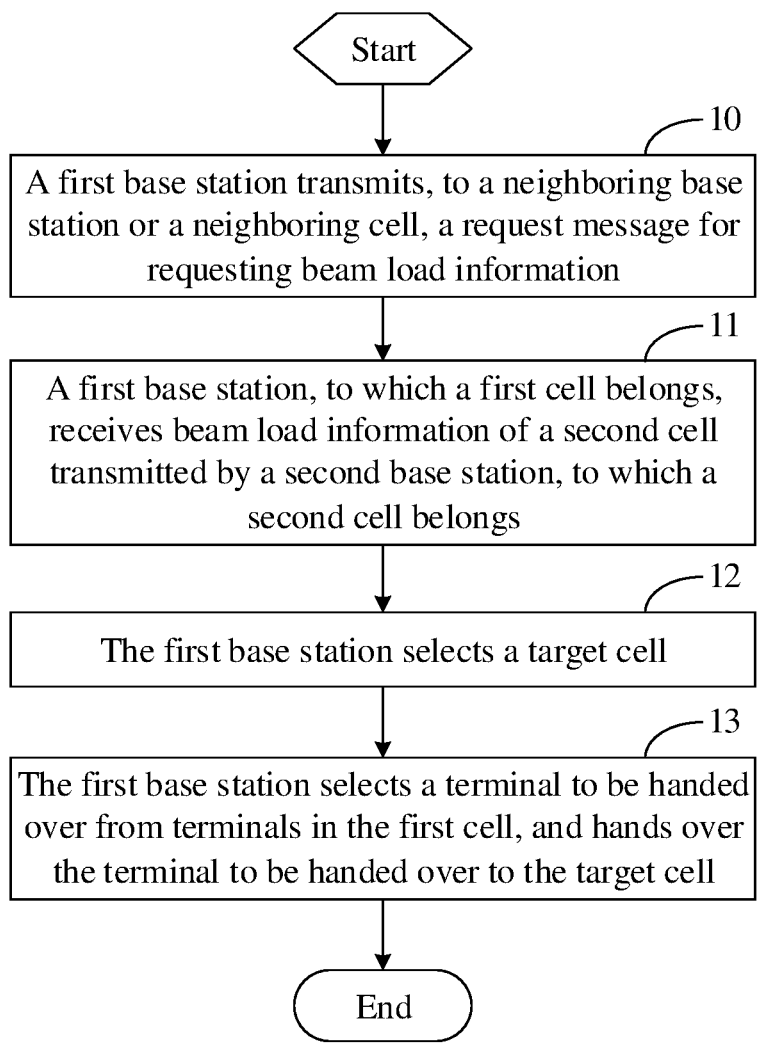
FIG. 1b is a second flow chart of a method for load balancing according to some embodiments of the present disclosure.

Referring to FIG. 1a-1b, some embodiments of the present disclosure provide a method for load balancing, applied to a first base station to which a first cell belongs. As shown in FIG. 1a, the method includes S11-S13.

In S11, a first base station receives beam load information of a second cell transmitted by a second base station to which a second cell belongs.

In some embodiments of the present disclosure, the beam load information of the second cell may be indication information quantitatively represented by a specific value, or may be indication information qualitatively represented by a load degree such as "low", "middle", and "high".

Optionally, referring to FIG. 1b, another method for load aggregation provided by some embodiments of the present disclosure may further include S10.

In S10, a first base station transmits, to a neighboring base station or a neighboring cell, a request message for requesting beam load information.

Specifically, the first base station transmits a request message to the neighboring base station or the neighboring cell when detecting that the load of a first beam of the first cell exceeds a first threshold.

In some embodiments, the request message carries beam identification information of the first beam and/or beam identification information of a second beam of the second base station, and the second beam is a beam of which the first base station requests to obtain beam load information. In the description of the disclosure, the term "beam" may be a synchronization signal block (SSB). Herein, the beam identification information is represented by an identification of a reference signal used by the beam, and the reference signal comprises a synchronization signal/physical broadcast channel (SS/PBCH) block and/or a channel state information-reference signal (CSI-RS).

In some embodiments of the present disclosure, information such as respective beams and coverage areas may be exchanged between base stations through an inter-base station interface (such as an Xn interface or an X2 interface). The first base station may further acquire, according to a measurement report of a terminal, information such as beam information of a neighboring base station and signal reception quality of the terminal on a beam of the neighboring base station. Therefore, in order to obtain the load information of the second beam, which may be used to share the load of the first beam, and there may be an overlapping area between the coverage area of the second beam and the coverage area of the first beam.

In some embodiments, the request message may carry indication information of a request reason, and the request reason is beam-based load balancing.

Optionally, the request message further indicates a type of beam load information request to be obtained, and the type of beam load information comprises at least one of the following types: an uplink Physical Resource Block (PRB) Usage, a downlink PRB Usage, an uplink data throughput, a downlink data throughput, an available capacity, and a ratio of available capacity.

In the above-mentioned S11, receiving the beam load information of the second cell transmitted by the second base station may specifically includes:

1) receiving a response message returned by the second base station for the request message, the response message carrying the beam load information of the second cell; and/or, 2) receiving beam load update information periodically transmitted by the second base station according to the request message, the beam load update information carrying the beam load information of the second cell.

In some embodiments, the second base station returns a response message, such as through a RESOURCE STATUS RESPONSE, after receiving the request message transmitted by the first base station, and the response message carries the beam load information of the second cell. In the 5G system, the second base station transmits a response message to the first base station through the Xn interface.

In some other embodiments, the second base station periodically transmits beam load update information to the first base station, such as through a RESOURCE STATUS UPDATE, and the beam load update information carries the beam load information of the second cell.

Further, when the second base station transmits the beam load information of the second cell to the first base station, the second base station may selectively transmit the beam load information of a first-type beam which may serve as a target beam of the handover. In this case, the beam load information of the second cell is the beam load information of the first-type beam of the second cell.

Specifically, the first-type beam may be:
a beam with a load below a first threshold;
a beam on which signal reception quality of a terminal meets a second threshold;
or
a beam with a load below a first threshold, on which signal reception quality of a terminal meets a second threshold.

In S12, the first base station selects a target cell according to the beam load information of at least one neighboring cell.

In some embodiments of the present disclosure, the first base station selects a target cell according to the beam load information of at least one neighboring cell. The target cell may be a cell belonging to a neighboring base station, such as a second cell belonging to a second base station, or the target cell may be a cell other than the first cell belonging to the first base station. Of course, in addition to the beam load information of the neighboring cell, the first base station may select the target cell according to more factors such as signal reception quality of the terminal on the beam.

Further, the first base station selects one or more target beams from the second-type beams of the neighboring cell, and determines the target cell according to the neighboring cell to which the target beam belongs.

Herein, the second-type beams may be the following:
a beam having an overlap with a coverage area of the first beam;
a beam having an overlap with a coverage area of the first beam and having a load lower than a third threshold;
or, a beam having an overlap with a coverage area of the first beam, and having a load lower than a third threshold, and on which signal reception quality of a terminal meets a fourth threshold.

Specifically, the first threshold, the second threshold, the third threshold, or the fourth threshold may be predefined by a protocol, may be transmitted to the second base station through an interaction message in an inter-base station interface establishment process, or may be transmitted to the second base station through an inter-base station interface update interface information.

As an implementation, the first base station may further transmit the first threshold, the second threshold, the third threshold, or the fourth threshold to the second base station through a request message carrying the thresholds, for example, through a RESOURCE STATUS REQUEST.

It is to be noted that the first threshold, the second threshold, the third threshold, and the fourth threshold may be determined or transmitted independently of each other. As an optional example, the first threshold may be predefined by a protocol, the second threshold may be transmitted to the second base station through an interaction message in an inter-base station interface establishment process, the third threshold may be transmitted to the second base station through an interface update interface information carrying the thresholds, and the fourth threshold may be carried in the transmitted request message.

In S13, the first base station selects a terminal to be handed over from terminals of the first cell, and hands over the terminal to be handed over to the target cell.

In some embodiments of the present disclosure, the handover of the terminal to be handed over to the target cell comprises: transmitting, to the target cell, a handover request for the terminal to be handed over, and/or transmitting, to the terminal to be handed over, a handover command for performing handover to the target cell. Optionally, the handover request and/or the handover command carry indication information of a handover reason, and the handover reason is beam-based load balancing; further, the handover request further carries indication information of a target beam of the handover.

Herein, when the load of the first beam of the first cell exceeds the first threshold, the first base station may select some or all of the terminals under the first beam as the terminals to be switched. The terminals under the first beam refer to the terminals which communicate with the first base station through the first beam.

According to the above-mentioned steps, in some embodiments of the present disclosure, the first base station may acquire the beam load information of the cells in the first base station or in other base station cells, such that the terminal under the first beam may be handed over, according to the beam load information, to other beams of the first base station or of neighboring base stations when the load of the first beam of the first cell of the first base station is heavy, thereby reducing the load of the first beam and realizing the beam-based load balancing.

Figure 2A:
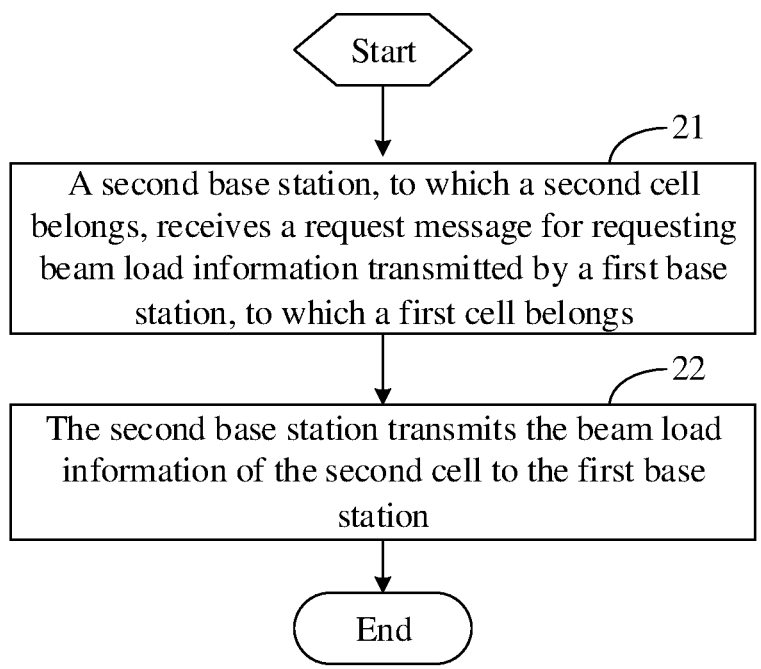
FIG. 2a is a third flow chart of a method for load balancing according to some embodiments of the present disclosure.

Referring to FIG. 2a, some embodiments of the present disclosure provide another method for load balancing, applied to a second base station to which a second cell belongs. The method includes S21-S22.

In S21, a second base station to which a second cell belongs receives a request message for requesting beam load information transmitted by a first base station to which a first cell belongs.

In some embodiments of the present disclosure, the request message may be transmitted by the first base station when a load of a first beam of a cell of the first base station exceeds a first threshold, the request message carries beam identification information of the first beam and/or beam identification information of a second beam of the second cell, and the second beam is a beam of which the first base station requests to obtain beam load information. Further, there is an overlapping area between a coverage area of the second beam and a coverage area of the first beam.

Specifically, the above-mentioned beam identification information is represented by an identification of a reference signal used by the beam, and the reference signal includes a synchronization signal/physical broadcast channel (SS/PBCH) block and/or a channel state information-reference signal (CSI-RS).

In some embodiments, the request message may carry indication information of a request reason, and the request reason is beam-based load balancing.

Optionally, the request message further indicates a type of beam load information request to be obtained, and the type of beam load information comprises at least one of the following types: an uplink Physical Resource Block (PRB) Usage, a downlink PRB Usage, an uplink data throughput, a downlink data throughput, an available capacity, and a ratio of available capacity.

In S22, the second base station transmits the beam load information of the second cell to the first base station.

A response message for the request message is transmitted to the first base station, wherein the response message carries beam load information of the second cell.

In some embodiments, the second base station returns a response message, e.g., through a RESOURCE STATUS RESPONSE, after receiving the request message transmitted by the first base station, and the response message carries the beam load information of the second cell. In the 5G system, the second base station may transmit a response message to the first base station through the Xn interface.

And/or, beam load update information periodically transmitted by the second base station according to the request message is received. The beam load update information carries beam load information of the second cell.

In some other embodiments, the second base station periodically transmits the beam load update information to the first base station, e.g., through a RESOURCE STATUS UPDATE, and the beam load update information carries the beam load information of the second cell.

Further, the beam load information of the second cell is beam load information of a first-type beam of the second cell.

Herein, the first-type beam is a beam with a load below a first threshold;

the first-type beam is a beam on which signal reception quality of a terminal meets a second threshold; or, the first-type beam is a beam with a load below a first threshold, and is a beam on which signal reception quality of a terminal meets a second threshold.

The above-mentioned first threshold or second threshold is predefined by a protocol;

the above-mentioned first threshold or second threshold is transmitted to the second base station through an interaction message in an inter-base station interface establishment process;

the above-mentioned first threshold or second threshold is transmitted to the second base station through the inter-base station interface update interface information, for example, transmitted to the second base station through a RESOURCE STATUS UPDATE;

or, the above-mentioned first threshold or second threshold is transmitted to the second base station through the request message carrying the thresholds, for example, transmitted to the second base station through a RESOURCE STATUS REQUEST.

Figure 2B:
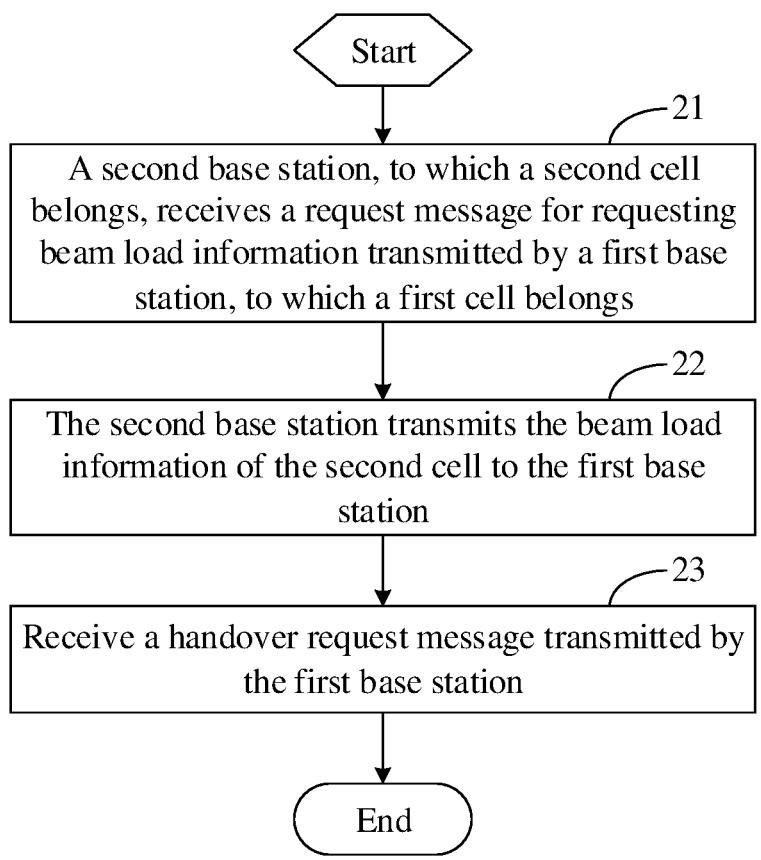
FIG. 2b is a fourth flow chart of a method for load balancing according to some embodiments of the present disclosure.

Referring to FIG. 2b, another method for load balancing provided by some embodiments of the present disclosure further includes S23 after S22 of FIG. 2a.

In S23, a handover request message transmitted by the first base station is received.

In some embodiments of the present disclosure, the handover request message carries indication information of a handover reason, and the handover reason is beam-based load balancing.

Further, the handover request message further carries indication information of a target beam of the handover.

Based on the method for load balancing provided in the above-mentioned embodiments, some embodiments of the present disclosure further provide a device for implementing the above-mentioned method.

Figure 3:
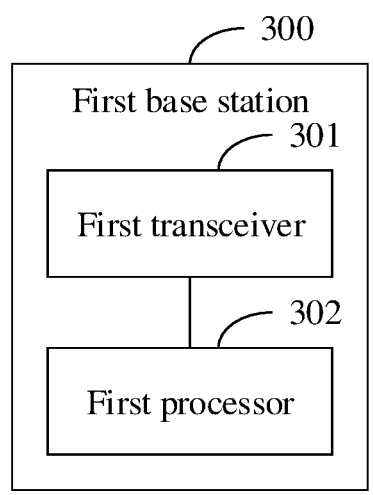
FIG. 3 is a schematic structural diagram of a first base station according to some embodiments of the present disclosure.

Referring to FIG. 3, some embodiments of the present disclosure provide a first base station 300. A first cell belongs to the first base station 300. The first base station includes a first transceiver 301 and a first processor 302.

Herein, the first transceiver 301 is configured to receive beam load information of a second cell transmitted by a second base station to which a second cell belongs.

Optionally, the first processor 302 is configured to select a target cell; and select a terminal to be handed over from terminals of the first cell, and hand over the terminal to be handed over to the target cell.

Optionally, the first transceiver 301 is further configured to transmit a request message for requesting beam load information to a neighboring base station or to a neighboring cell.

Optionally, the first transceiver 301 is further configured to transmit the request message to a neighboring base station or to a neighboring cell when detecting that a load of a first beam of the first cell exceeds a first threshold.

Optionally, the request message carries beam identification information of the first beam and/or beam identification information of a second beam of the second base station, and the second beam is a beam of which the first base station requests to obtain beam load information.

Optionally, there is an overlapping area between a coverage area of the second beam and a coverage area of the first beam.

Optionally, the beam identification information is represented by an identification of a reference signal used by the beam, and the reference signal includes a synchronization signal/physical broadcast channel SS/PBCH block and/or a channel state information-reference signal CSI-RS.

Optionally, the request message carries indication information of a request reason, and the request reason is beam-based load balancing.

Optionally, the request message further indicates a type of beam load information request to be obtained, and the type of beam load information comprises at least one of the following types: an uplink Physical Resource Block (PRB) Usage, a downlink PRB Usage, an uplink data throughput, a downlink data throughput, an available capacity, and a ratio of available capacity.

Optionally, the first transceiver 301 is further configured to receive a response message returned by the second base station for the request message, wherein the response message carries the beam load information of the second cell.

And/or, the first transceiver 301 is further configured to receive beam load update information periodically transmitted by the second base station according to the request message, wherein the beam load update information carries the beam load information of the second cell.

Optionally, the beam load information of the second cell is beam load information of a first-type beam of the second cell.

Herein, the first-type beam is a beam with a load below a first threshold;

the first-type beam is a beam on which signal reception quality of a terminal meets a second threshold;

or, the first-type beam is a beam with a load below a first threshold, and is a beam on which signal reception quality of a terminal meets a second threshold.

Optionally, the first processor 302 is further configured to select a target cell according to beam load information of at least one neighboring cell.

Optionally, the first processor 302 is further configured to select one or more target beam from a second-type beams of a neighboring cell, and determine a target cell based on the neighboring cell to which the target beam belongs.

Herein, there is an overlap between a coverage area of the second-type beams and a coverage area of the first beam;

or, there is an overlap between a coverage area of the second-type beams and a coverage area of the first beam, and a beam load is lower than a third threshold;

or, there is an overlap between a coverage area of the second-type beams and a coverage area of the first beam, a beam load is lower than a third threshold, and signal reception quality of a terminal on the second-type beams meets a fourth threshold.

Optionally, the first threshold, the second threshold, the third threshold, or the fourth threshold is predefined by a protocol, is transmitted to the second base station through an interaction message in an inter-base station interface establishment process, is transmitted to the second base station through an inter-base station interface update interface information, or is carried in the request message which is transmitted to the second base station.

Optionally, the first transceiver 301 is further configured to transmit, to the target cell, a handover request for the terminal to be handed over, and/or transmit, to the terminal to be handed over, a handover command for performing handover to the target cell.

Optionally, the handover request and/or handover command carry indication information of a handover reason, and the handover reason is beam-based load balancing.

Optionally, the handover request further carries indication information of a target beam of the handover.

Figure 4:
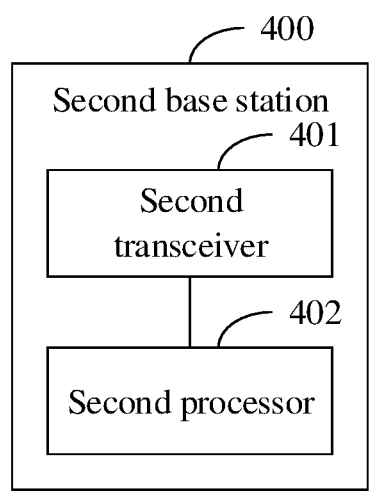
FIG. 4 is a schematic structural diagram of a second base station according to some embodiments of the present disclosure.

Referring to FIG. 4, some embodiments of the present disclosure provide a second base station 400 to which a second cell belongs. The second base station 400 includes: a second transceiver 401 and a second processor 402.

Herein, the second transceiver 401 is configured to transmit beam load information of the second cell to a first base station.

Optionally, before the second transceiver 401 transmits the beam load information of the second cell to the first base station, the second transceiver 401 is further configured to receive a request message for requesting the beam load information, wherein the request message is transmitted by the first base station.

Optionally, the request message is transmitted by the first base station when a load of a first beam of a cell of the first base station exceeds a first threshold, the request message carries beam identification information of the first beam and/or beam identification information of a second beam of the second cell, and the second beam is a beam of which the first base station requests to obtain beam load information.

Optionally, there is an overlapping area between a coverage area of the second beam and a coverage area of the first beam.

Optionally, the request message carries indication information of a request reason, and the request reason is beam-based load balancing.

Optionally, the beam identification information is represented by an identification of a reference signal used by the beam, and the reference signal includes a synchronization signal/physical broadcast channel SS/PBCH block and/or a channel state information-signal CSI-RS.

Optionally, the request message further indicates a type of beam load information request to be obtained, and the type of beam load information comprises at least one of the following types: an uplink Physical Resource Block (PRB) Usage, a downlink PRB Usage, an uplink data throughput, a downlink data throughput, an available capacity, and a ratio of available capacity.

Optionally, the second transceiver 401 is further configured to transmit, to the first base station, a response message for the request message, wherein the response message carries beam load information of the second cell. and/or, And/or, The second transceiver 401 is further configured to transmit periodically, to the first base station, beam load update information carrying beam load information of the second cell.

Optionally, the beam load information of the second cell is beam load information of a first-type beam of the second cell.

Herein, the first-type beam is a beam with a load below a first threshold;

the first-type beam is a beam on which signal reception quality of a terminal meets a second threshold;

or, the first-type beam is a beam with a load below a first threshold, and is a beam on which signal reception quality of a terminal meets a second threshold.

Optionally, the first threshold or the second threshold is predefined by a protocol, is transmitted to the second base station through an interaction message in an inter-base station interface establishment process, is transmitted to the second base station through an inter-base station interface update interface information, or is carried in the request message which is transmitted to the second base station.

Optionally, the second transceiver 401 is further configured to receive a handover request message transmitted by the first base station.

The handover request message carries indication information of a handover reason, and the handover reason is beam-based load balancing.

Optionally, the handover request message further carries indication information of a target beam of the handover.

Figure 5:
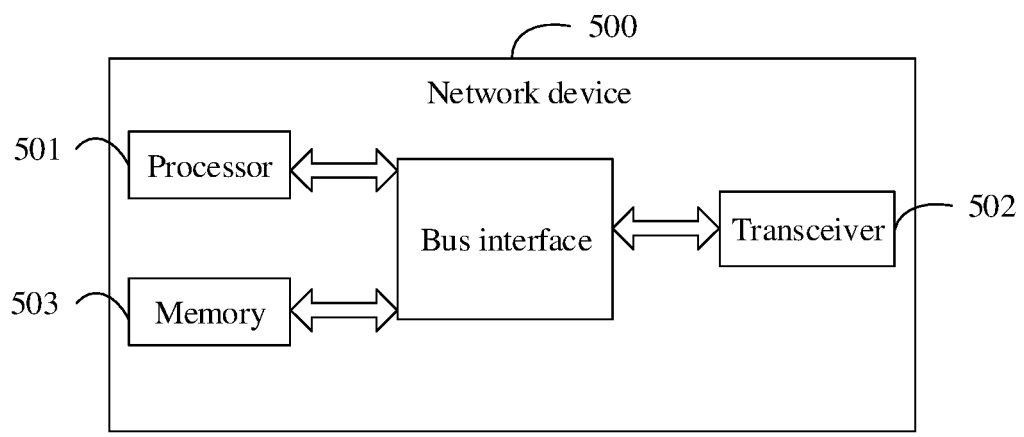
FIG. 5 is a schematic structural diagram of a network device according to some embodiments of the present disclosure.

Referring to FIG. 5, some embodiments of the present disclosure provide another network device 500 including a processor 501, a transceiver 502, a memory 503, and a bus interface.

The processor 501 may be responsible for managing the bus architecture and general processing. The memory 503 may store data used by the processor 501 in performing operations.

In some embodiments of the present disclosure, the network device 500 may further include a program stored on the memory 503 and executable on the processor 501, wherein the program when executed by the processor 501 implements the steps of the methods provided in the embodiments of the present disclosure.

In FIG. 5, the bus architecture may include any number of interconnected buses and bridges, and specifically, links together various circuits including one or more processors represented by processor 501 and a memory represented by memory 503. The bus architecture may further link together other circuits, such as peripherals, voltage regulators, and power management circuits, which is well known in the art and therefore is not further described in the embodiments of the present disclosure. The bus interface provides an interface. Transceiver 502 may be a plurality of elements, i.e., transceiver 502 may include a transmitter and a receiver and provide units for communicating with other devices on a transmission medium.

Some embodiments of the present disclosure further provide a computer readable storage medium having stored thereon a computer program which, when executed by a processor, implements the processes of the above-described method embodiments and achieves the same technical effect. To avoid repetition, details are not described herein. The computer readable storage medium includes, for example, a Read-Only Memory (ROM for short), a Random Access Memory (RAM for short), a magnetic disk, or an optical disk.

It is to be understood that the embodiments described in the present disclosure may be implemented in hardware, software, firmware, middleware, microcode, or combinations thereof. For a hardware implementation, the processing units may be implemented in one or more Application Specific Integrated Circuits (ASIC), Digital Signal Processors (DSP), DSP Devices (DSPD), Programmable Logic Devices (PLD), Field-Programmable Gate Arrays (FPGA), general purpose processors, controllers, microcontrollers, microprocessors, other electronic units for performing the functions described in the present disclosure, or combinations thereof.

For a software implementation, the techniques described in the embodiments of the present disclosure may be implemented by modules (e.g., processes, functions, etc.) that perform the functions described in the embodiments of the present disclosure. The software codes may be stored in a memory and executed by a processor. The memory may be implemented in the processor or external to the processor. It is to be noted that, in the disclosure, the terms "comprises," "comprising," or any other variations thereof, are intended to cover a non-exclusive inclusion, such that a process, method, article, or device that comprises a series of elements includes not only those elements but also other elements not expressly listed, or also includes elements inherent to such process, method, article, or device. Without more limitations, an element defined by the statement "include a . . . " does not rule out additional identical elements in a process, method, article, or device that includes the element.

The embodiments of the present disclosure have been described above in connection with the accompanying drawings, but the present disclosure is not limited to the specific embodiments described above. The specific embodiments described above are merely illustrative and not restrictive, and those of ordinary skill in the art will be able to make many forms without departing from the spirit of the disclosure and the scope of the claims, all of which fall within the protection of the disclosure.

The invention claimed is:

1. A method for load balancing, comprising:
   transmitting, by a first base station, to which a first cell belongs, to a neighboring base station or a neighboring cell, a request message for requesting beam load information; and
   receiving, by the first base station, beam load information of a second cell transmitted by the neighboring base station, to which the second cell belongs,
   wherein the request message further indicates a type of beam load information to be obtained, and the type of beam load information comprises at least one of the following types: an uplink Physical Resource Block (PRB) Usage, a downlink PRB Usage, an uplink data throughput, a downlink data throughput, an available capacity, or a ratio of available capacity.

2. The method of claim 1, wherein transmitting, to the neighboring base station or the neighboring cell, the request message for requesting the beam load information comprises:
   transmitting, by the first base station, the request message to the neighboring base station or the neighboring cell, when detecting that a load of a first beam of the first cell exceeds a first threshold.

3. The method of claim 1, wherein the request message carries:
   at least one of beam identification information of a first beam or beam identification information of a second beam of the neighboring base station, wherein the second beam is a beam of which the first base station requests to obtain the beam load information; or
   indication information of a request reason, wherein the request reason is beam-based load balancing.

4. The method of claim 3, wherein there is an overlapping area between coverage area of the second beam and a coverage area of the first beam; or
   wherein the at least one of beam identification information of the first beam or beam identification information of the second beam is represented by an identification of a reference signal used by the first beam or the second beam, and the reference signal comprises at least one of a synchronization signal/physical broadcast channel (SS/PBCH) block or a channel state information-reference signal (CSI-RS).

5. The method of claim 1, wherein receiving the beam load information of the second cell transmitted by the neighboring base station comprises at least one of the following:
   receiving a response message returned by the neighboring base station for the request message, the response message carrying the beam load information of the second cell; or
   receiving beam load update information transmitted periodically by the neighboring base station according to the request message, the beam load update information carrying the beam load information of the second cell.

6. The method of claim 1, wherein the beam load information of the second cell is beam load information of a first-type beam of the second cell, and wherein the first-type beam is a beam with a load below a first threshold; or
   the first-type beam is a beam on which signal reception quality of a terminal meets a second threshold; or
   the first-type beam is the beam with the load below the first threshold, and is the beam on which the signal reception quality of the terminal meets the second threshold.

7. The method of claim 1, further comprising:
   selecting, by the first base station, a target cell according to beam load information of at least one neighboring cell; and
   selecting, by the first base station, a terminal to be handed over from terminals of the first cell, and handing over the terminal to be handed over to the target cell.

8. The method of claim 7, wherein selecting the target cell according to the beam load information of the at least one neighboring cell comprises:
   selecting one or more target beams from second-type beams of the neighboring cell, and determining the target cell based on the neighboring cell to which the one or more target beams belong;
   wherein, there is an overlap between a coverage area of the second-type beams and a coverage area of a first beam; or
   there is the overlap between the coverage area of the second-type beams and the coverage area of the first beam, and a beam load of the second-type beams is lower than a third threshold; or
   there is the overlap between the coverage area of the second-type beams and the coverage area of the first beam, the beam load of the second-type beams is lower than the third threshold, and signal reception quality of a terminal on the second-type beams meets a fourth threshold.

9. The method of claim 8, wherein a first threshold, a second threshold, the third threshold, or the fourth threshold is predefined by a protocol, or
- the first threshold, the second threshold, the third threshold, or the fourth threshold is transmitted to the neighboring base station through an interaction message in an inter-base station interface establishment process, or
- the first threshold, the second threshold, the third threshold, or the fourth threshold is transmitted to the neighboring base station through an inter-base station interface update interface information, or
- the first threshold, the second threshold, the third threshold, or the fourth threshold is carried in the request message which is transmitted to the neighboring base station.

10. The method of claim 7, wherein handing over the terminal to be handed over to the target cell comprises at least one of the following:
- transmitting, to the target cell, a handover request for the terminal to be handed over, or
- transmitting, to the terminal to be handed over, a handover command for performing handover to the target cell.

11. The method of claim 10, wherein at least one of the handover request or the handover command carries at least one of the following:
- indication information of a handover reason; or
- indication information of a target beam of the handover,
wherein the handover reason is beam-based load balancing.

12. A method for load balancing, comprising:
- receiving, by a second base station, to which a second cell belongs, a request message for requesting beam load information, the request message being transmitted by a first base station, to which a first cell belongs; and
- transmitting, by the second base station, beam load information of the second cell to the first base station,
- wherein the request message further indicates a type of beam load information to be obtained, and the type of beam load information comprises at least one of the following types: an uplink Physical Resource Block (PRB) Usage, a downlink PRB Usage, an uplink data throughput, a downlink data throughput, an available capacity, or a ratio of available capacity.

13. The method of claim 12, wherein the request message is transmitted by the first base station when a load of a first beam of a cell of the first base station exceeds a first threshold, the request message carries at least one of beam identification information of the first beam or beam identification information of a second beam of the second cell, and the second beam is a beam of which the first base station requests to obtain the beam load information; or
- wherein the request message carries indication information of a request reason, and the request reason is beam-based load balancing.

14. The method of claim 13, wherein there is an overlapping area between a coverage area of the second beam and a coverage area of the first beam; or
- wherein the beam identification information is represented by an identification of a reference signal used by the first beam or the second beam, and the reference signal comprises at least one of a synchronization signal/physical broadcast channel (SS/PBCH) block or a channel state information-reference signal (CSI-RS).

15. The method of claim 13, further comprising:
receiving a handover request message transmitted by the first base station;
wherein the handover request message carries at least one of the following:
- indication information of a handover reason, or
- indication information of a target beam of a handover,
wherein the handover reason is beam-based load balancing.

16. The method of claim 12, wherein transmitting, by the second base station, to which the second cell belongs, the beam load information of the second cell to the first base station, to which the first cell belongs, comprises at least one of the following:
- transmitting, to the first base station, a response message for the request message, the response message carrying the beam load information of the second cell; or
- transmitting periodically, to the first base station, beam load update information carrying the beam load information of the second cell.

17. The method of claim 16, wherein the beam load information of the second cell is beam load information of a first-type beam of the second cell; wherein,
- the first-type beam is a beam with a load below a first threshold; or
- the first-type beam is a beam on which signal reception quality of a terminal meets a second threshold; or
- the first-type beam is the beam with the load below the first threshold, and is the beam on which the signal reception quality of the terminal meets the second threshold.

18. The method of claim 17, wherein the first threshold or the second threshold is predefined by a protocol, or
- the first threshold or the second threshold is transmitted to the second base station through an interaction message in an inter-base station interface establishment process, or
- the first threshold or the second threshold is transmitted to the second base station through an inter-base station interface update interface information, or
- the first threshold or the second threshold is carried in the request message which is transmitted to the second base station.

19. A network device, comprising a memory, a processor and a program stored on the memory and executable on the processor, the program, when executed by the processor, implementing a method for load balancing, the method comprising:
- transmitting, by a first base station, to which a first cell belongs, to a neighboring base station or a neighboring cell, a request message for requesting beam load information, and receiving, by the first base station, beam load information of a second cell transmitted by a second base station, to which the second cell belongs; or
- receiving, by the second base station, to which the second cell belongs, the request message for requesting the beam load information, the request message being transmitted by the first base station, to which the first cell belongs, and transmitting, by the second base station, the beam load information of the second cell to the first base station,
wherein the request message further indicates a type of beam load information to be obtained, and the type of beam load information comprises at least one of the following types: an uplink Physical Resource Block (PRB) Usage, a downlink PRB Usage, an uplink data throughput, a downlink data throughput, an available capacity, or a ratio of available capacity.

* * * * *